Figure 1:
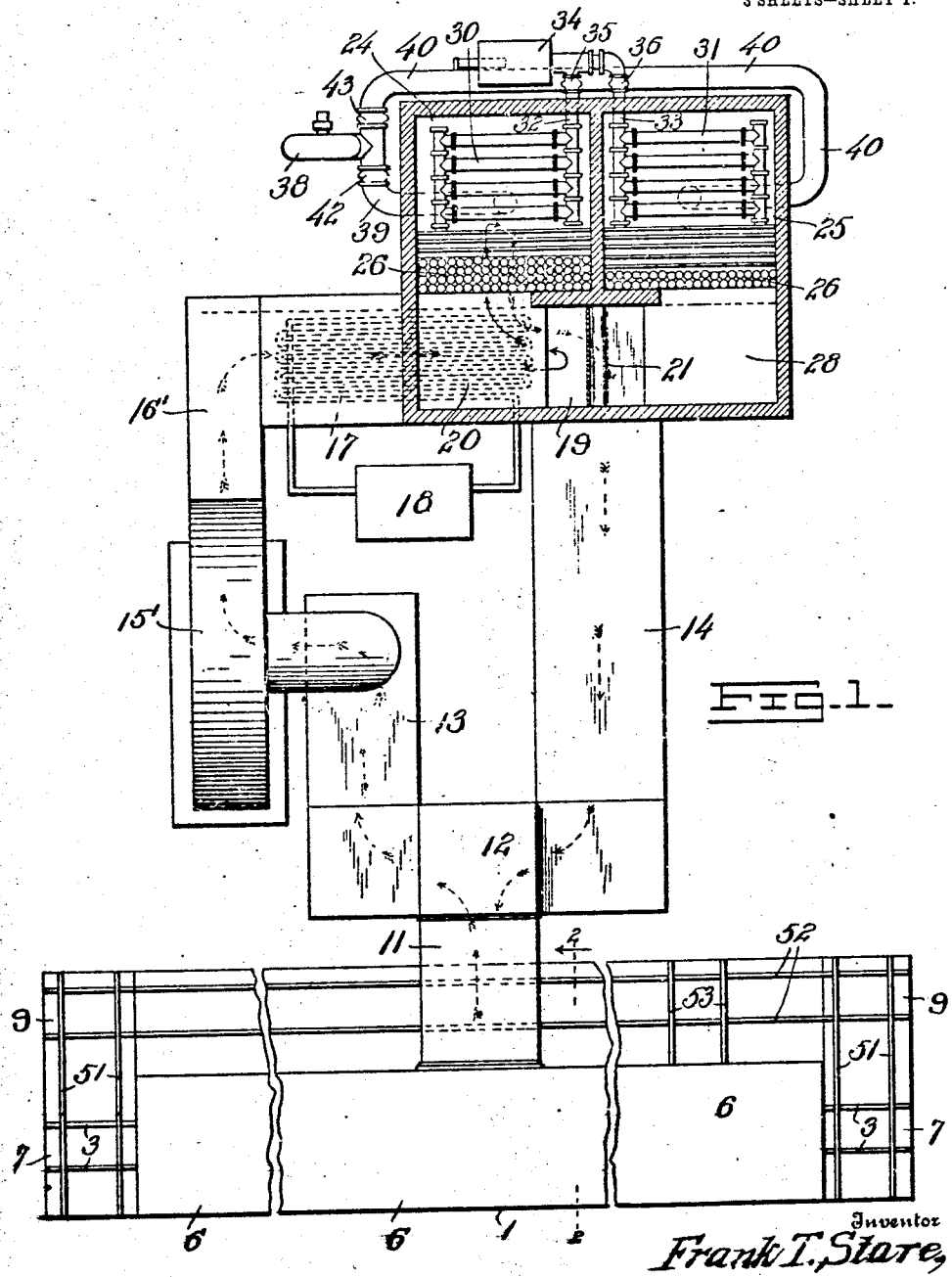

No. 872,026. PATENTED NOV. 26, 1907.
F. T. STARE.
DEHYDRATING APPARATUS.
APPLICATION FILED MAY 21, 1907.

3 SHEETS—SHEET 1.

Witnesses
Inventor
Frank T. Stare,
By Howard A. Coombs
his Attorney

No. 872,026.  
PATENTED NOV. 26, 1907.  
F. T. STARE.  
DEHYDRATING APPARATUS.  
APPLICATION FILED MAY 21, 1907.  
3 SHEETS—SHEET 2.
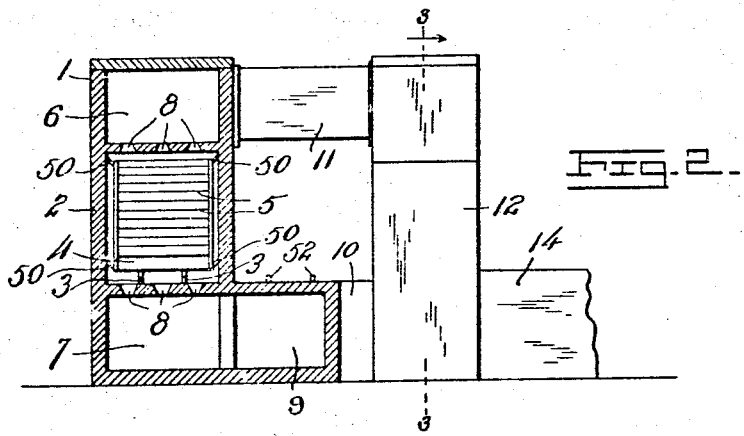
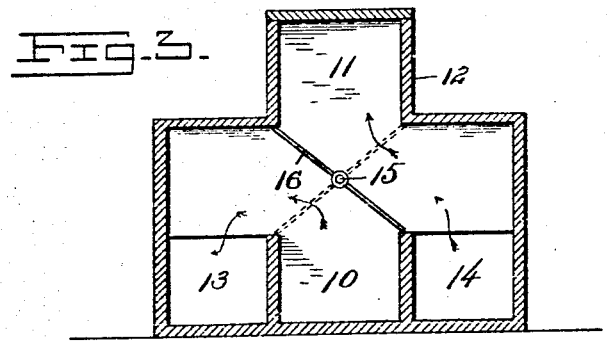
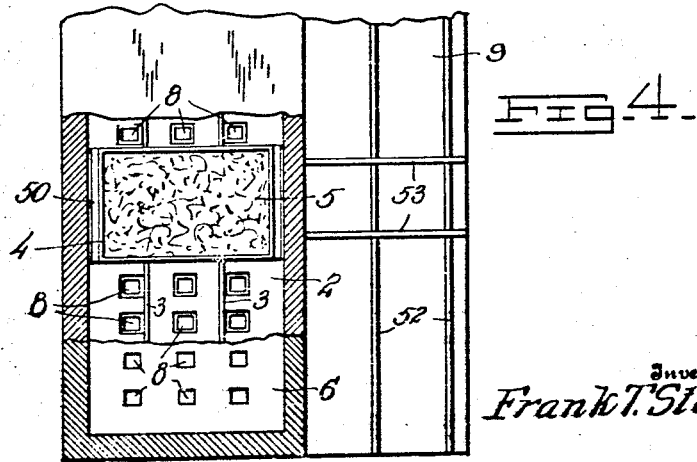
Witnesses
Inventor  
Frank T. Stare,  
By Howard A. Coombs  
his Attorney No. 872,026. PATENTED NOV. 26, 1907.
F. T. STARE.
DEHYDRATING APPARATUS.
APPLICATION FILED MAY 21, 1907.
3 SHEETS—SHEET 3.
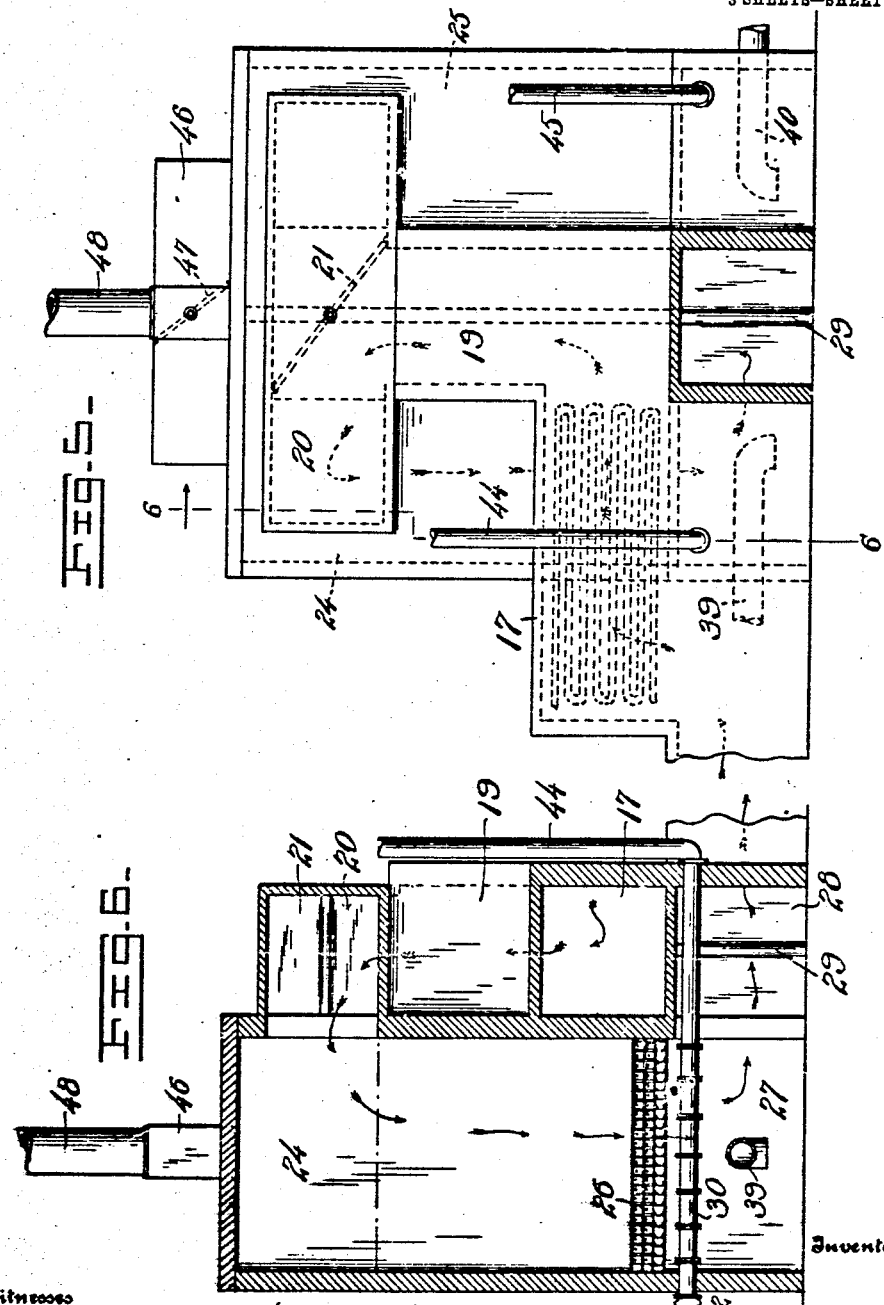
Witnesses
Inventor
Frank T. Stare,
his Attorney

UNITED STATES PATENT OFFICE.

FRANK TEMPEST STARE, OF WAUKESHA, WISCONSIN, ASSIGNOR TO AMERICAN DEHYDRATING COMPANY, A CORPORATION OF WISCONSIN.

DEHYDRATING APPARATUS.

No. 872,026.  Specification of Letters Patent.  Patented Nov. 26, 1907.

Application filed May 21, 1907. Serial No. 374,965.

*To all whom it may concern:*

Be it known that I, FRANK TEMPEST STARE, a citizen of the United States, residing at Waukesha, in the county of Waukesha and State of Wisconsin, have invented certain new and useful Improvements in Dehydrating Apparatus, of which the following is a specification.

My invention relates to apparatus for dehydrating food substances and the like, and consists in the construction and arrangement, in combination, of a chamber in which the material to be treated is placed, and means for maintaining a constant circulation of air, through said chamber, through a condenser, and through an air drier, in which two latter apparatus the moisture extracted by the air from the material is wholly or partially removed therefrom.

My invention further consists in the combination of the several individual apparatus, just mentioned, with a valve mechanism in which the direction of flow of the air through the dehydrating chamber can be reversed, when desired, without thereby changing the direction of the flow of air in the remainder of the plant; such reversal results in a more perfect dehydration than can be obtained when the air flows constantly in the same direction.

My invention further consists in the combination with the dehydrating chamber of a fan or blower which draws the air from said chamber, a condenser and a pair of air driers through one of which, at a time, the air from the condenser is passed, to re-enter the dehydrating chamber.

Means are provided, as will be hereafter further described, to apply heat to that one of the driers through which the air is not being passed.

The construction and arrangement of the various parts of the apparatus referred to, will be better understood from the following detailed description taken in connection with the accompanying 3 sheets of drawings, in which, Figure 1, is a plan view of the complete plant, the air driers being shown in section. Fig. 2, is a transverse section taken on the line 2—2 of Fig. 1. Fig. 3, is a transverse section taken on the line 3—3, of Fig. 2. Fig. 4, is a plan view, partly in section, of the right-hand end of the dehydrating chamber in Fig. 1. Fig. 5, is an end view of the condenser and the driers, the flue leading back to the dehydrating chamber being shown in section and, Fig. 6, is a cross section taken on the line 6—6, of Fig. 5.

In these views, the dehydrating chamber as a whole is indicated by 1, the same consisting of a long tunnel 2, containing tracks 3, on which run cars 4, carrying the trays, 5, containing the material to be treated. In said chamber, above said tunnel, is an air flue 6, running the entire length of the chamber, and beneath said tunnel there is a flue 7, the top and floor of the tunnel being provided with apertures 8, for the passage of the air into and out of the flues 6 and 7. Said apertures as shown are rectangular in shape, and preferably flare toward the tunnel, as shown in Figs. 2 and 4, for the purpose of better distributing the air through the material.

Alongside of flue 7 runs a flue 9, which opens into said flue at the ends thereof, and is connected at its center by a pipe 10 with the valve casing 12, to be described. Flue 6 communicates with the upper part of said casing 12, by a pipe 11, which enters said flue 6 at its center.

The valve casing 12, most clearly shown in Fig. 3, has the flues 10, and 11, running from the dehydrating chamber, entering it vertically above each other at its center. From the rear end of said casing there run two conduits 13 and 14, leading to or from the other apparatus, which constitutes the plant, as will be later more fully described. These two conduits communicate with the casing near its bottom, and at the sides thereof. In the center of the casing is pivoted at 15 for vertical oscillation, a valve 16, which in the position shown in Fig. 3, puts the pipe 11, into communication with the conduit 14, and the pipe 10 into communication with the conduit 13. When the valve 16 is swung into its other position, shown in dotted lines in Fig. 3, pipe 11, is in communication with the conduit 13, and pipe 10 with conduit 14.

The conduit 13 leads to the fan or blower 15', and the air drawn by said fan from said conduit passes by flue 16', up into and through a condenser 17, consisting of a series of coils of pipe through which a cooling medium circulates from a refrigerator 18. After passing through said condenser, the air passes vertically upward through a chimney 19, communicating at its top with a transverse flue 20, containing a valve 21, similar to the valve 16, above described, and communicating at its ends with the upper portions of two air driers 24 and 25, which comprise a series of superimposed receptacles 26, containing calcium-chlorid or other moisture-absorbing substance.

The details of construction of the air-driers and of the chlorid receptacles do not constitute a part of the present invention, and therefore need not be specifically described herein, it being sufficient to state that the air in its passage down through the driers is all forced to come in contact with the moisture absorbing substance in the receptacles, so that when it issues at the bottom into the chamber 27, practically all the water left therein, after its passage through the condenser, has been extracted therefrom.

At the bottom of the drier, the air passes into a chamber 27, which communicates with a transverse flue 28, which in turn contains a valve 29, similar to the valves 16 and 21, and opens into the flue 14, by which it is returned to the valve-casing 12, and from there back to the dehydrating chamber through pipe 10, or pipe 11, according to the position in which the valve 16 is set at the time.

It will be seen that the valve 21, serves to direct the air into one or the other of the driers, 24 or 25, and, as has been stated, the other drier, at this time, is subjected to heat to remove the moisture which was previously taken up thereby from the air coming from the dehydrating chamber. The heating means consists of radiators 30 and 31, lying respectively under the driers 24 and 25, in the chambers 27, and connected by pipes 32 and 33, respectively, with a furnace or burner 34, said pipes 32 and 33, being provided with valves 35 and 36, whereby the heat from the furnace can be conducted to one or the other of the radiators alternately.

Air is forced into the chambers 27 from a blower 38, communicating by pipes 39 and 40, respectively, with said chambers, said pipes having valves 42 and 43 to direct the air into one or the other of said chambers alternately. The pipes 39 and 40 open downwardly into said chambers below the radiator pipes 30 and 31, as indicated in Fig. 5, so that the air may be thoroughly distributed through said radiator pipes, and be thoroughly heated thereby before entering the driers.

The outlet for the flames or heated gases, which pass through the radiators, is through stacks 44 and 45, and it will be seen that by this arrangement none of the smoke or products of combustion from the furnace comes into contact with the air which is used to dry the moisture-absorbing substance in the driers. The air heated by its passage through the radiator pipes passes through the driers, and issues from the top thereof into a flue 46, containing a valve 47, and from there into a stack 48.

In the arrangement illustrated, it is the left hand drier 24 which is "active", that is to say, through which the air is passing in the circuit containing the dehydrating chamber and condenser, and the right hand drier 25 is being dried by the hot air rising through the same, and all connections between said driers 25 and the circuit through which the air being dried is passing, being shut off by means of the valves 21, 29, and 47, so that there is no danger of any of the hot air being used in the drier 25 coming into contact with the air being dried passing through the drier 24.

It will be seen that the air always passes in the same direction through conduit 13, fan 15', flue 16', condenser 17, chimney 19, and flue 20, and from one or the other drier 24 or 25 into conduit 14, while the direction of the air in the dehydrating chamber can be reversed by oscillating valve 16 so that it either enters from conduit 14 into pipe 11, which enters flue 6 at the middle of the dehydrating chamber, or else it goes from conduit 14 into pipe 10, thence into flue 9 which communicates with flue 7 at the ends of the chamber. The result of this is that the air either enters the flue at the top of the dehydrating chamber at its middle, and leaves the flue at the bottom at its ends, or vice versa, whereby it is caused to pass through all the material contained in the tunnel 2.

While I have shown no means for actuating the various valves, it will be understood that they are either to be manually controlled, or that they can be automatically controlled at definite time intervals.

The cars 1, are provided on their sides with hinged flap-valves 50, which prevent the air from passing between the sides of the trays and the tunnel, and, when in series in the tunnel, at their ends, so as to prevent the air from passing between the ends of the trays on adjacent cars.

The cars are placed in a continuous series in the tunnel, one being removed at one end, when a freshly-loaded car is pushed in at the other end, and are transferred by means of the tracks 51, lying transversely at the ends of the tunnel, to and from the track 52, lying on top of flue 9, by means of which they are run back again to the other end of the tunnel. At a point near the issuing end of the tunnel, a door, not shown, is formed in its side, through which passes the transverse track 53, the purpose of which is to enable a car to be run out for the purpose of inspecting the material.

Having thus described my invention, what I claim is,

1. In a dehydrating apparatus, the combination with a chamber in which the material to be treated is placed, a condenser and an air drier, of means to maintain a current of air flowing through said chamber, condenser and drier and means to reverse the direction of the current of air through said chamber.

2. In a dehydrating apparatus, the combination with a chamber in which the material to be treated is placed, a condenser and an air drier, of means to maintain a current of air flowing to and from said chamber and through said condenser and drier constantly in the same direction and means to reverse the flow of air through said chamber.

3. In a dehydrating apparatus, the combination with a tunnel to receive the material being treated and having apertures in its roof and floor, of an air-flue running longitudinally along the top thereof and an air-flue running longitudinally along the bottom thereof, a pipe communicating with one of said flues at its center, a second pipe communicating with the other of said flues at its ends, a valve-casing to which said pipes lead, means to maintain a constant flow of air to and from said casing, and a valve in said casing to cause the air to either enter said tunnel through the air-flue at the bottom and issue through the air-flue at the top, or vice versa.

4. In a dehydrating apparatus, the combination with a tunnel to contain the material to be treated and having in its roof and floor, an air-flue running along above the roof, and an air-flue running along beneath the floor, said air-flues communicating with said tunnel through said apertures, of a valve-casing, two air-conduits leading thereto, a moisture extractor, means to maintain a current of air flowing in the same direction from said valve-casing through said moisture-extractor and back to said valve-casing, a pipe leading from said casing to the center of one of said flues, a second pipe leading from said casing to the ends of the other of said flues, and a single valve in said casing to cause the air to enter either of said pipes, pass through the tunnel and issue from the other.

5. In a dehydrating apparatus, the combination with a chamber for the material to be treated, of a condenser, an air-drier, and a valve-casing, means to cause a constant flow of air in the same direction, from said casing, through said condenser, and drier, and back to said casing, a pipe leading from said casing to the top of said chamber, a second pipe leading from said casing to the bottom of said chamber, and a single valve in said casing to reverse the direction of the air flowing through said pipes and the chamber.

6. In a dehydrating apparatus, the combination with a dehydrating chamber having an air flue at the top and bottom, communicating with said chamber through its roof and floor, respectively, of a valve-casing, a pipe leading from the top thereof to the upper of said air-flues, and a second pipe leading from the bottom thereof to the lower of said air-flues, two air-conduits connected to said casing at the bottom thereof on opposite sides of said second pipe, means to maintain a constant flow of air into said casing through one of said conduits and out through the other, a valve pivotally mounted in the center of said casing, so as to cause, when in one extreme position, the air from the inlet-conduit to enter the chamber through the upper of said pipes, and issue through the lower of said pipes into the outlet-conduit, and when in the other extreme position, to cause the air from the inlet-conduit to enter the chamber through the lower of said pipes and issue through the upper of said pipes to the outlet-conduit.

7. In a dehydrating apparatus, the combination with a dehydrating chamber of a pair of air-driers, means to cause a current of air to flow in a circuit through said chamber and one of said driers, means to drive off the moisture from that one of the driers which is temporarily out of the circuit, and means to periodically reverse the direction of the current of air through the chamber.

8. In a dehydrating apparatus, the combination with a dehydrating chamber, a condenser, and a pair of air-driers of a blower to draw air through said chamber and force it through said condenser and driers, and means to convey the air back to said chamber, a valve whereby the direction in which the said air flows through said chamber can be reversed and valves, whereby either drier can be cut out of the circuit.

9. In a dehydrating apparatus, the combination of a dehydrating chamber, a valve-casing connected to said chamber at its top and bottom, a blower connected to said valve casing, a condenser connected to said blower, a pair of air-driers connected to said condenser and also to said casing, valves in said last mentioned connection to cut either one drier or the other out of the circuit and a valve in said casing to reverse the flow of the air through said chamber.

10. In a dehydrating plant the combination of a dehydrating chamber, a condenser, a pair of air-driers, means to maintain a closed circulation of air through said apparatus in the order named, means to cut one of said driers at a time, out of the circuit, means to drive off the moisture from the drier so cut out, and means to reverse the directions of flow of the air through said chamber, without reversing the apparatus.

11. In a dehydrating apparatus, the combination with a dehydrating chamber of a pair of air-driers, a blower to force air from said chamber to said driers, a valve, to direct the air into one side or the other, of said driers, a conduit leading from the bottom of said driers back to said chamber, a valve in said conduit to cut off either of said driers, a radiator under each drier, means to force air through either of said radiators up through the corresponding driers, a stack connected to both driers and a valve to shut off the stack from either of the driers.

12. In a dehydrating apparatus, the combination of a dehydrating chamber comprising a tunnel to receive a series of trucks carrying trays for the material to be treated, said tunnel having an air-flue along its top and an air-flue beneath its floor, communicating with the tunnel through apertures in its top and floor, respectively, a condenser and a pair of driers, means to draw air from one of said flues force it through to said condenser and one of said driers, back to the other of said flues, means to change the direction of flow of the air between said flues and means to alternately cut-out one of said air driers and means to supply heated air to the drier so cut out.

In testimony whereof I have affixed my signature, in presence of two witnesses.

FRANK TEMPEST STARE.

Witnesses:
R. W. CRARY,
E. D. SELTZER.